United States Patent
Lee et al.

(10) Patent No.: US 12,368,742 B2
(45) Date of Patent: Jul. 22, 2025

(54) METHOD, DEVICE, AND COMPUTER-READABLE RECORDING MEDIUM FOR VISUALIZING ROUTE AND BEHAVIOR OF USER BY LINKING SECURITY THREAT AND SECURITY KERNEL OF SERVER-TERMINAL CONNECTION NETWORK

(71) Applicant: SGA Solutions Co.,Ltd., Seoul (KR)

(72) Inventors: Ki Uk Lee, Seongnam-si (KR); Sung Jun Park, Seongnam-si (KR)

(73) Assignee: SGA Solutions Co., Ltd., Seoul (KR)

( * ) Notice: Subject to any disclaimer, the term of this patent is extended or adjusted under 35 U.S.C. 154(b) by 0 days.

(21) Appl. No.: 18/019,600

(22) PCT Filed: Jun. 27, 2022

(86) PCT No.: PCT/KR2022/009155
§ 371 (c)(1),
(2) Date: Feb. 3, 2023

(87) PCT Pub. No.: WO2023/113125
PCT Pub. Date: Jun. 22, 2023

(65) Prior Publication Data
US 2024/0323207 A1    Sep. 26, 2024

(30) Foreign Application Priority Data

Dec. 13, 2021 (KR) .................. 10-2021-0177523

(51) Int. Cl.
*G06F 3/048* (2013.01)
*H04L 9/40* (2022.01)
(Continued)

(52) U.S. Cl.
CPC .......... *H04L 63/1425* (2013.01); *G06F 3/048* (2013.01); *H04L 41/22* (2013.01); *H04L 43/045* (2013.01); *H04L 63/1416* (2013.01)

(58) Field of Classification Search
CPC . H04L 63/1425; H04L 41/22; H04L 63/1416; H04L 9/40; H04L 43/00; H04L 43/045
See application file for complete search history.

(56) References Cited

U.S. PATENT DOCUMENTS

| 2015/0033086 A1* | 1/2015 | Sasturkar | G06F 11/079 |
| | | | 714/57 |
| 2015/0172321 A1* | 6/2015 | Kirti | H04L 63/1416 |
| | | | 726/1 |

(Continued)

FOREIGN PATENT DOCUMENTS

| KR | 10-2013-0044668 | 5/2013 |
| KR | 10-2013-0116830 | 10/2013 |

(Continued)

OTHER PUBLICATIONS

Office Action for Korea Patent Application No. 10-2021-0177523, mailed Mar. 2, 2022.

(Continued)

*Primary Examiner* — Shirley X Zhang

(57) ABSTRACT

In order to provide a technology, when an access having the possibility of a threatening factor according to an access failure is detected, for collecting information about the access to intuitively display the route of the threatening behavior on an interface that outputs the server-terminal connection network, and directly replaying the threatening behavior to intuitively identify the information on the access and easily identify a cause of the threat, a method for visualizing a route and a behavior of a user by linking a security threat and a security kernel of a server-terminal (Continued)

connection network according to one embodiment of the present invention includes: an access detection step of setting a plurality of terminals, servers accessible from the terminals, and communication processing devices between the terminals and the servers as nodes, and detecting an attempt to access one server from one terminal in a server-terminal connection network including a route on the network connecting the set nodes as links; a log collection step, based on the access detected in the access detection step, of collecting log information generated when the one terminal attempts to access; and a visualization step, when a visualization request input for the log information collected in the log collection step is received from an administrator terminal, of visualizing the nodes, the links and the log information on a visualization interface executed in the administrator terminal, wherein the visualization step, with respect to the log information on access failure, includes using the log information to display a node including a terminal attempting the access and a server to be accessed and links between nodes, and a visual effect indicating failure of log information, on the visualization screen of the server-terminal connection network on the visualization interface.

10 Claims, 12 Drawing Sheets

(51) Int. Cl.
*H04L 41/22* (2022.01)
*H04L 43/045* (2022.01)

(56) References Cited

U.S. PATENT DOCUMENTS

2022/0377099 A1* 11/2022 Berger ................ H04L 63/1416
2022/0414210 A1* 12/2022 El Rouby ............. G06F 21/552

FOREIGN PATENT DOCUMENTS

| KR | 10-1986738 | 6/2019 |
| KR | 10-2019-0118054 | 10/2019 |
| KR | 10-2181185 | 11/2020 |

OTHER PUBLICATIONS

PCT International Search Report for International Application No. PCT/KR2022/009155, Date of Mailing: Sep. 6, 2022.

* cited by examiner

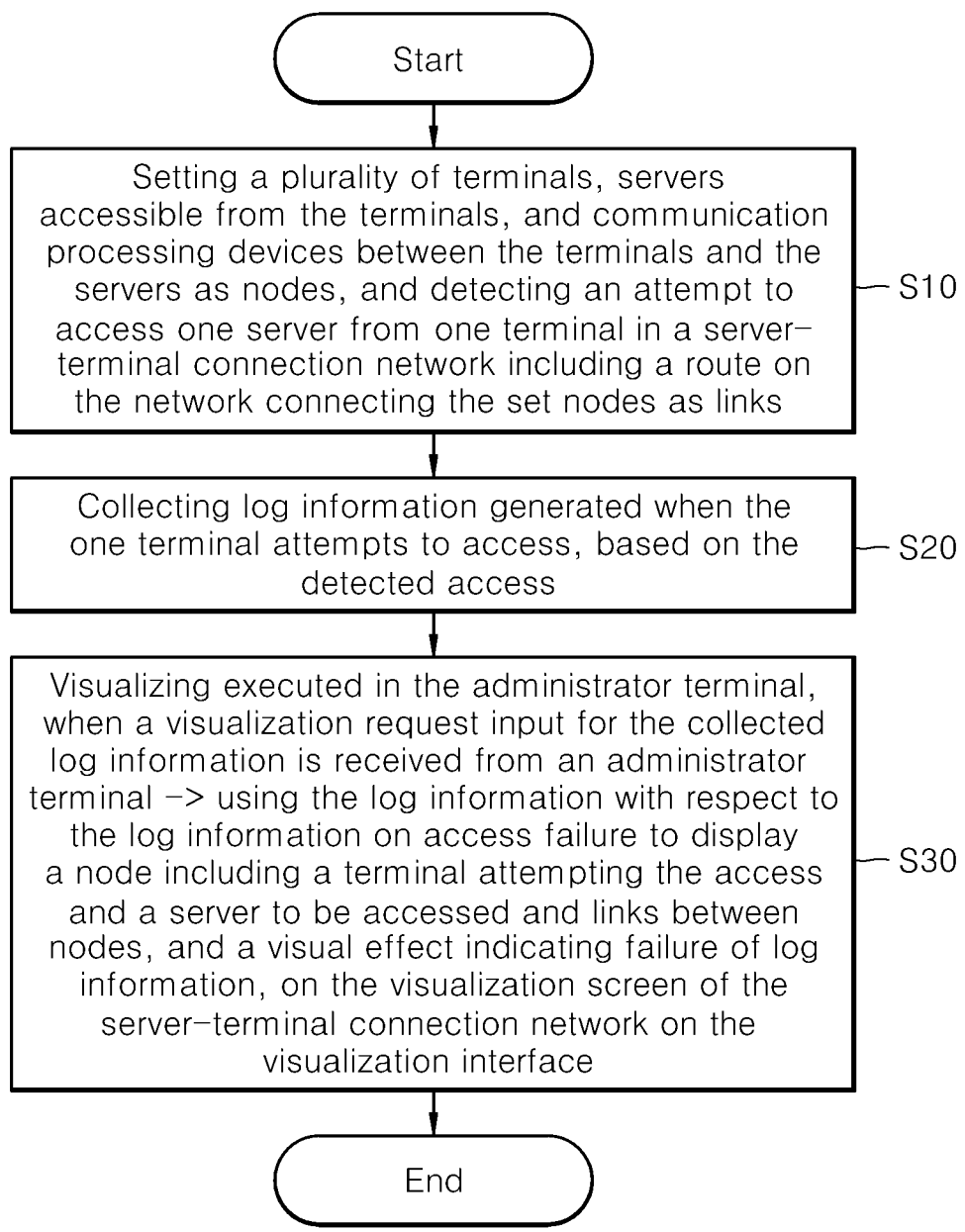
[FIG. 1]

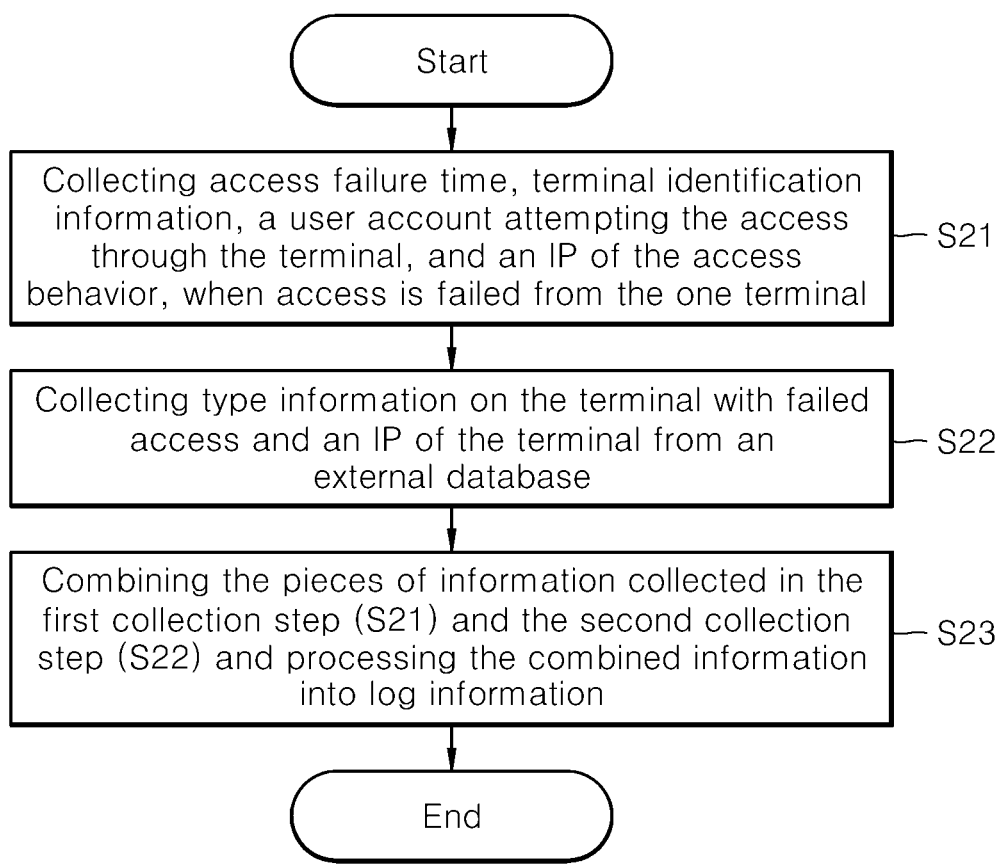
[FIG. 2]

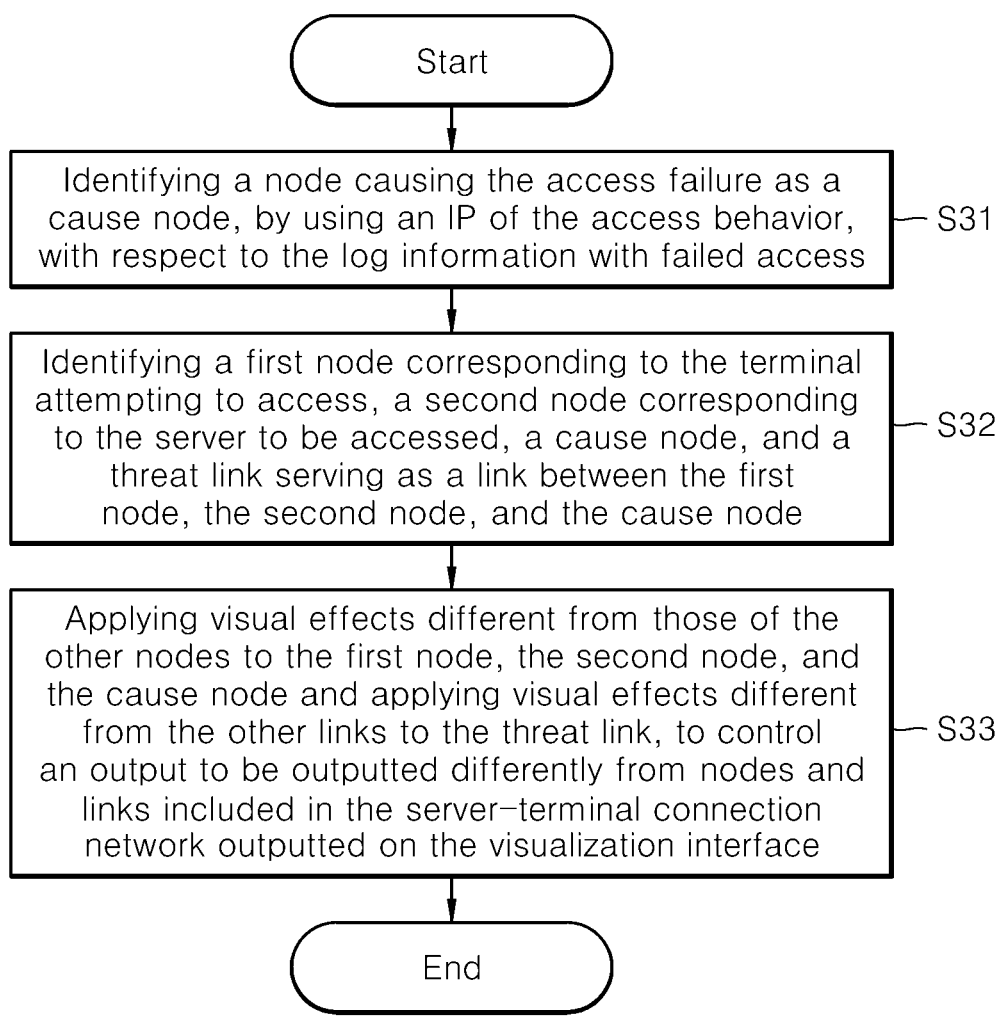
[FIG. 3]

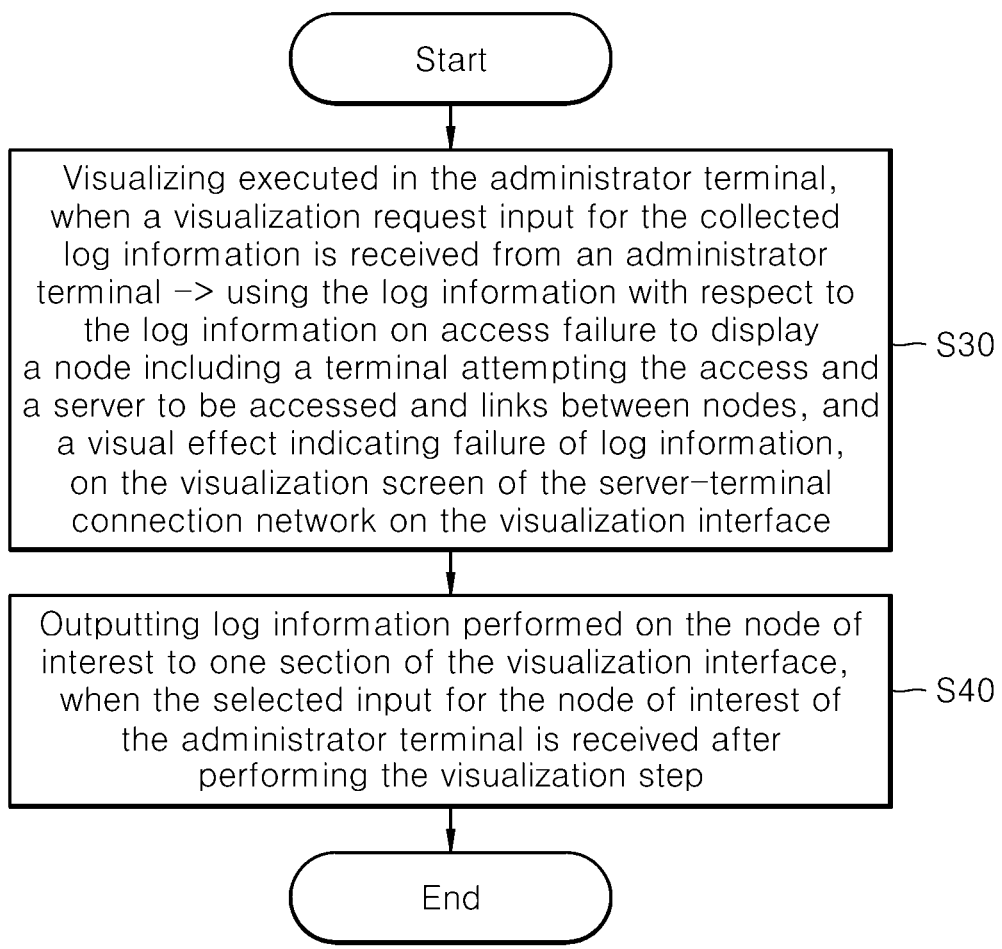

[FIG. 5]
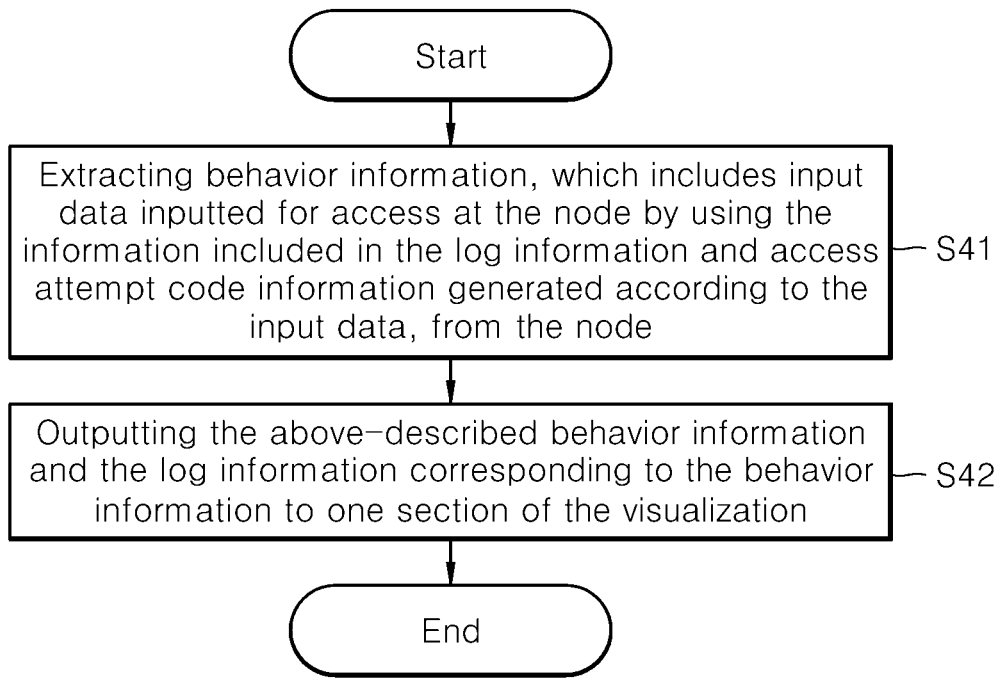

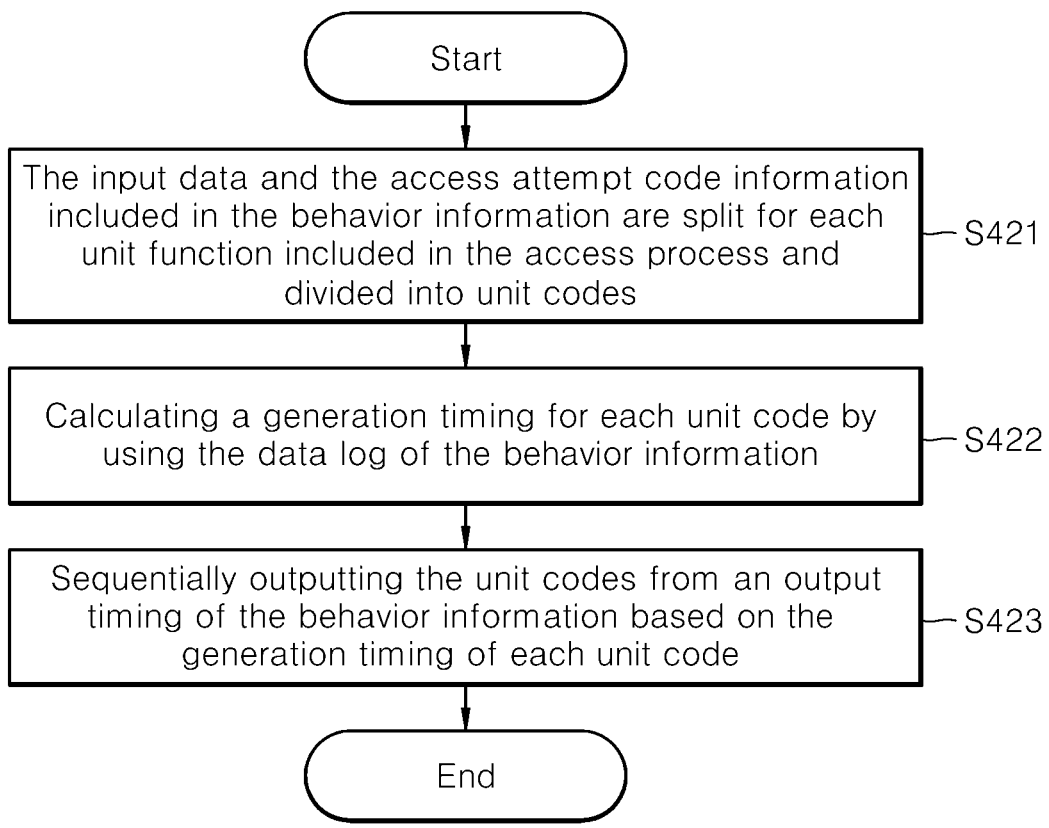
[FIG. 6]

[FIG. 7]
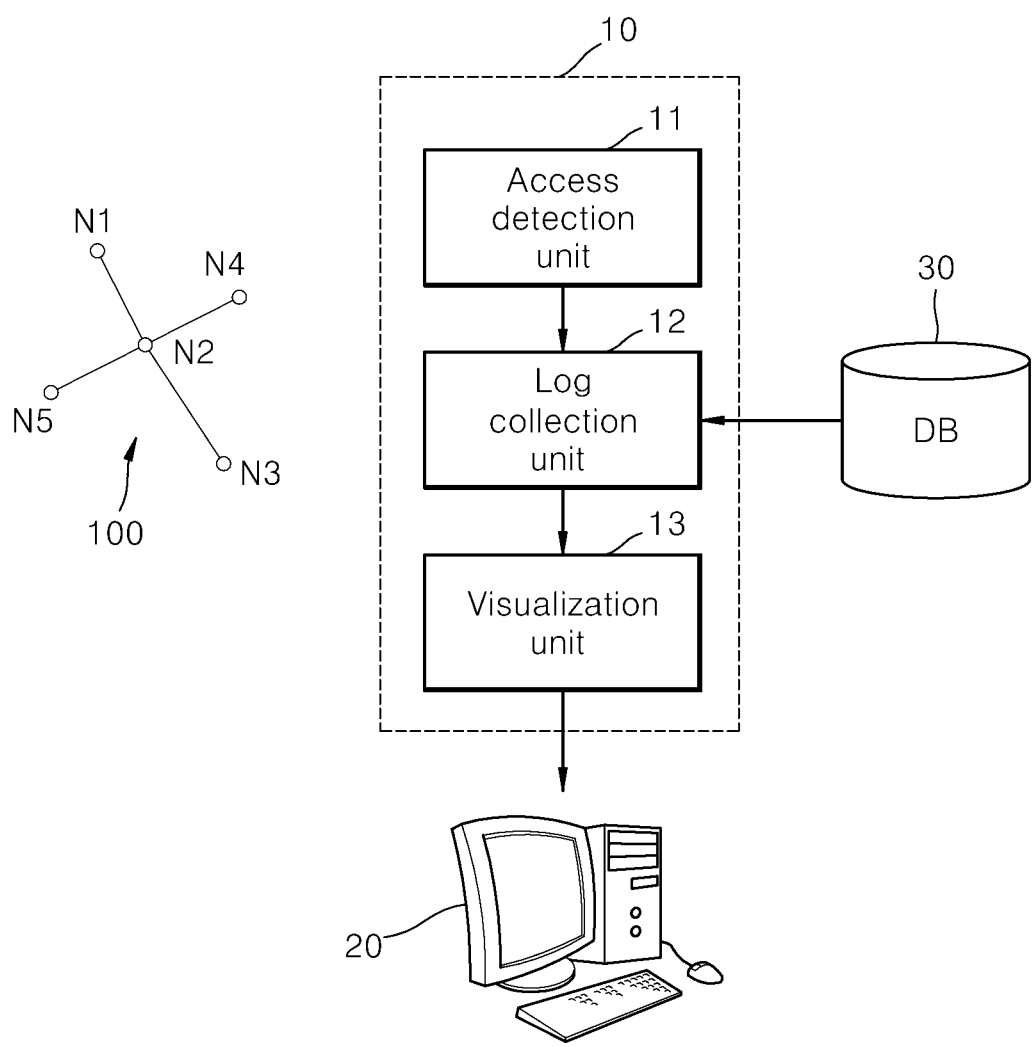

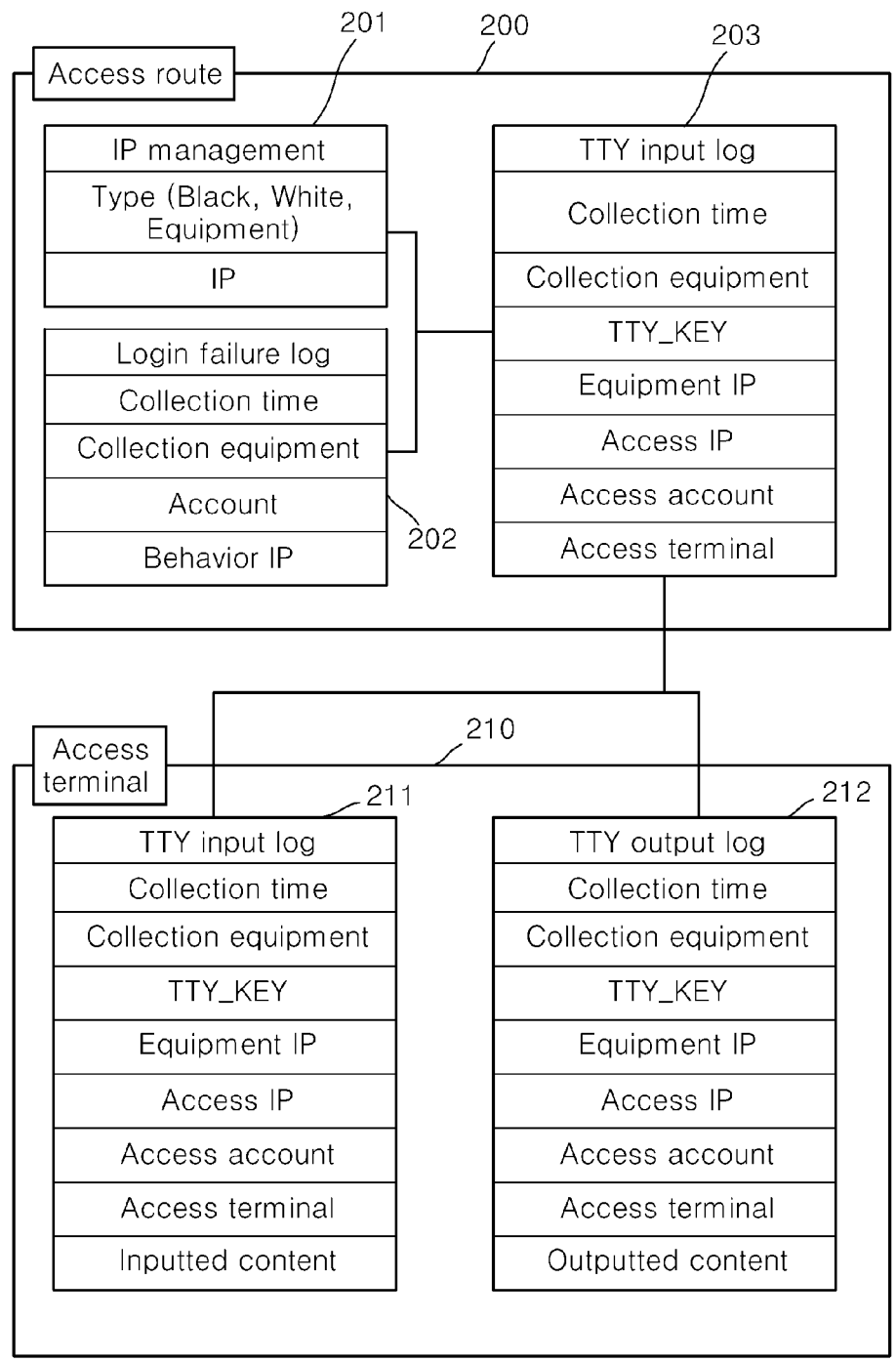
[FIG. 8]

[FIG. 9]
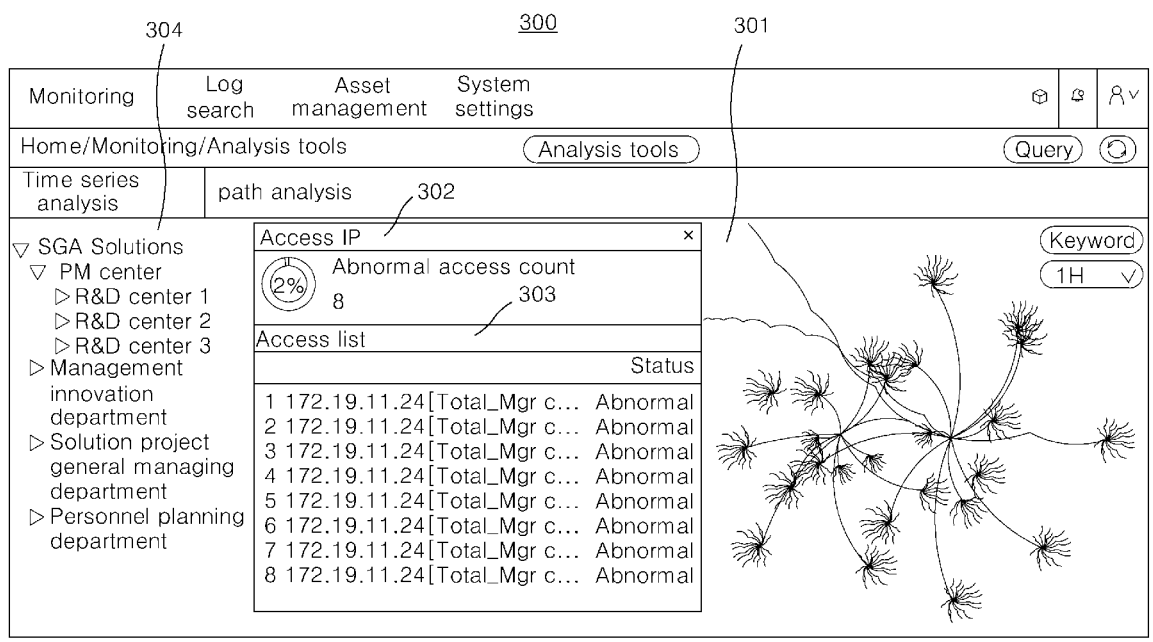

[FIG. 10]
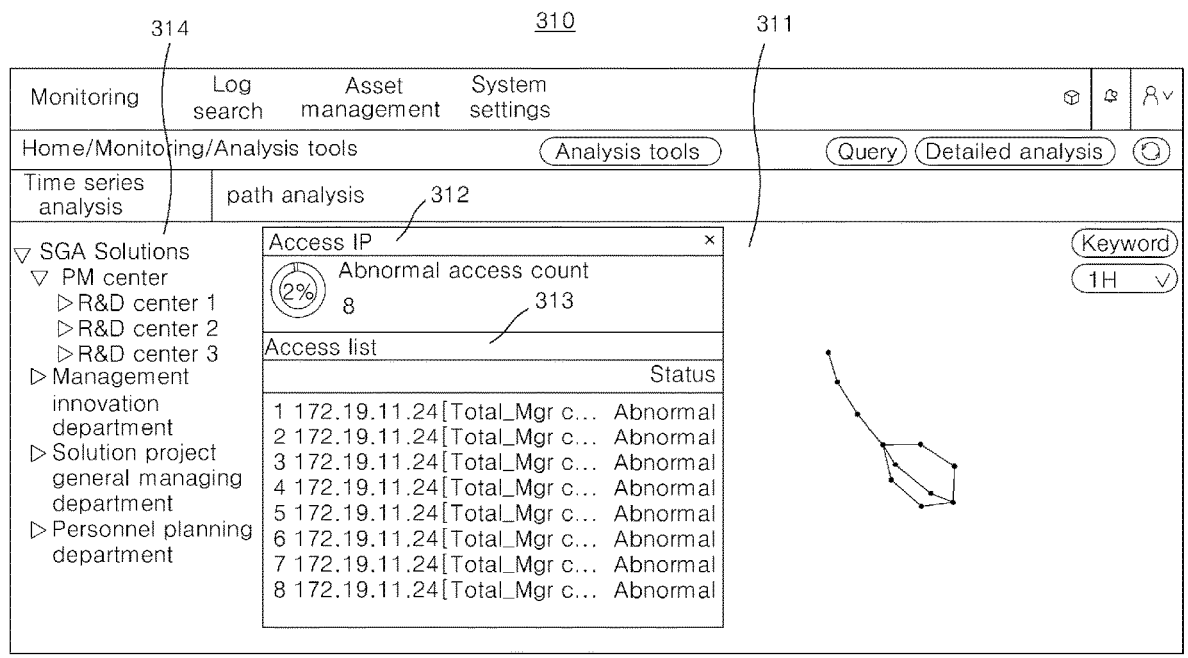

[FIG. 11]
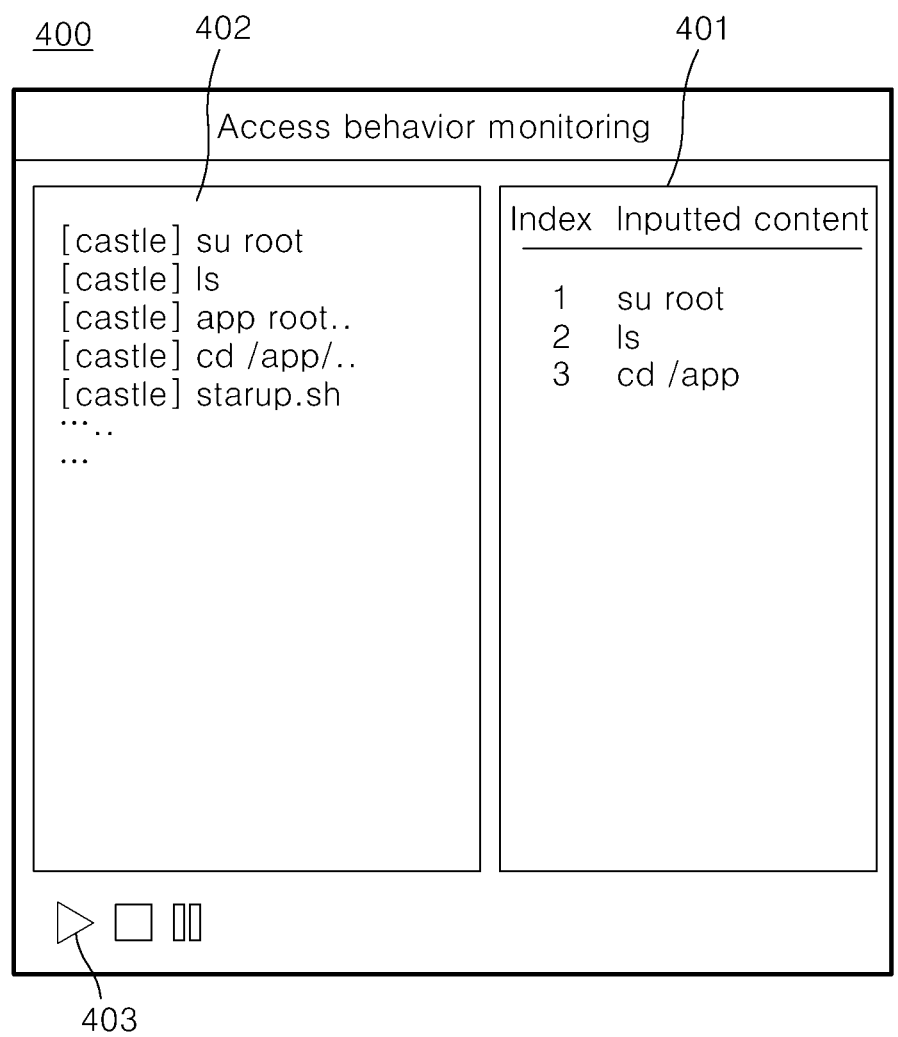

[FIG. 12]
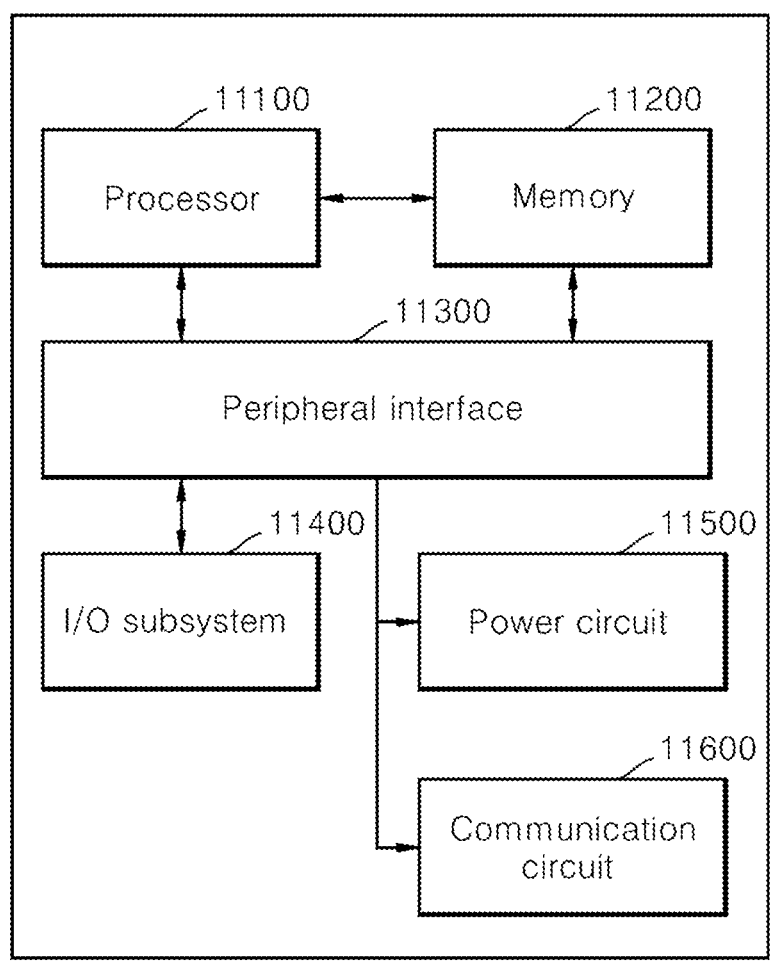

METHOD, DEVICE, AND COMPUTER-READABLE RECORDING MEDIUM FOR VISUALIZING ROUTE AND BEHAVIOR OF USER BY LINKING SECURITY THREAT AND SECURITY KERNEL OF SERVER-TERMINAL CONNECTION NETWORK

TECHNICAL FIELD

The present invention relates to a technology that identifies and visualizes routes for threatening behaviors in a server-terminal connection network composed of a plurality of terminals, servers to be accessed, and the like, and more particularly, to a technology, when an access having the possibility of a threatening factor according to an access failure is detected, for collecting information about the access to intuitively display the route of the threatening behavior on an interface that outputs the server-terminal connection network, and directly replaying the threatening behavior to intuitively identify the information on the access and easily identify a cause of the threat.

BACKGROUND ART

As various server-terminal connection networks are constructed, the importance of security technology on various networks including a server-terminal structure is increasing. Most of behaviors that may be a threat to security on the network are access failures due to a failure of normal access, and include, for example, a user authentication failure, an access through an abnormal route, and a blocking of access in the security network due to an access attempt including a threat code such as a hacking code.

In this case, most security networks prepare for security threats by blocking an access and creating a blacklist therefor to block and then track an access through the corresponding IP, account or the like.

As an example of the above technology, Korean Patent Registration No. 10-1022167 and the like provide a technology for generating an alarm for a directly relevant intrusion among intrusions that can affect the vulnerability of network assets, to clearly distinguish intrusions that pose a threat to the network assets among the various intrusions so as to notify a security threat through the intrusion alarm.

However, since existing network security threat detection technologies including technologies in the related art just provide functions such as detection and notification of threatening behaviors, the administrator is required to collect information about the corresponding behaviors one by one and identify the cause when the threatening behavior occurs.

Due to the above difficulties, only the detection of these threatening behaviors is not helpful in preventing behaviors that threaten security and preventing hacking in an environment such as a security network in which a server-terminal connection network is very complex and multiple threatening behaviors occur. Thus, the need for a technology capable of intuitively checking various information about threatening behaviors that pose a threat to security is increasing in a very complex environment.

DISCLOSURE

Technical Problem

Accordingly, an object of the present invention is to provide a technology in which an access route is very intuitively and easily identified with respect to an access detected as a security threat due to access failure, to very intuitively and easily identify an accurate section being threatened in view of security in a complex server-terminal connection network, thereby increasing the efficiency of network security management by an administrator.

In addition, another object of the present invention is to provide a technology in which, in addition to the access routes with respect to the threatening behavior, input data and detailed behaviors at the time of the threatening behavior are replayed without any change to enable the administrator to check, to more intuitively, quickly and accurately identify a cause of the threat, thereby responding very quickly to security threats.

Technical Solution

To this end, a method for visualizing a route and a behavior of a user by linking a security threat and a security kernel of a server-terminal connection network according to one embodiment of the present invention includes: an access detection step of setting a plurality of terminals, servers accessible from the terminals, and communication processing devices between the terminals and the servers as nodes, and detecting an attempt to access one server from one terminal in a server-terminal connection network including a route on the network connecting the set nodes as links; a log collection step, based on the access detected in the access detection step, of collecting log information generated when the one terminal attempts to access; and a visualization step, when a visualization request input for the log information collected in the log collection step is received from an administrator terminal, of visualizing the nodes, the links and the log information on a visualization interface executed in the administrator terminal, wherein the visualization step includes, with respect to the log information on access failure, using the log information to display a node including a terminal attempting the access and a server to be accessed and links between nodes, and a visual effect indicating failure of log information, on the visualization screen of the server-terminal connection network on the visualization interface.

The log collection step may include: a first collection step, when access is failed from the one terminal, of collecting access failure time, terminal identification information, a user account attempting the access through the terminal, and an IP of the access behavior; a second collection step of collecting type information on the terminal with failed access and an IP of the terminal from an external database; and a log information generation step of combining the pieces of information collected in the first collection step and the second collection step and processing the combined information into log information.

The visualization step may include: a threat node identification step, with respect to the log information with failed access, of identifying a node causing the access failure as a cause node by using an IP of the access behavior; a visualization target identification step of identifying a first node corresponding to the terminal attempting to access, a second node corresponding to the server to be accessed, a cause node, and a threat link serving as a link between the first node, the second node, and the cause node; and an effect application step of applying visual effects different from those of the other nodes to the first node, the second node, and the cause node, and applying visual effects different from the other links to the threat link, to control an output to be outputted differently from nodes and links included in the server-terminal connection network outputted on the visualization interface.

the effect application step may include applying the links containing the cause node and the visual effects on the cause node so as to be differently from other nodes and links identified by the visualization target identification step.

The visualization step may include controlling some nodes and links for the server-terminal connection network to be displayed on the visualization interface, through the function of Zoom-in/Zoom-out or the selection of network group subject to the input by the administrator terminal.

The method further includes: a behavior replay step, when the selected input for the node of interest of the administrator terminal is received after performing the visualization step, of outputting log information performed on the node of interest to one section of the visualization interface.

The behavior replay step may include: a behavior information tracking step of outputting the log information with access failure among the log information performed on the node of interest, and extracting behavior information, which includes input data inputted for access at the node by using the information included in the log information and access attempt code information generated according to the input data, from the node; and a behavior output step of outputting the behavior information and the log information corresponding to the behavior information to one section of the visualization interface.

The behavior output step may include: a code analysis step in which the input data and the access attempt code information included in the behavior information are split for each unit function included in the access process and divided into unit codes; a timeline analysis step of calculating a generation timing for each unit code by using the data log of the behavior information; and an output control step of sequentially outputting the unit codes from an output timing of the behavior information based on the generation timing of each unit code.

Meanwhile, a device for visualizing a route and a behavior of a user by linking a security threat and a security kernel of a server-terminal connection network according to one embodiment of the present invention includes: an access detection unit for setting a plurality of terminals, servers accessible from the terminals, and communication processing devices between the terminals and the servers as nodes, and detecting an attempt to access one server from one terminal in a server-terminal connection network including a route on the network connecting the set nodes links; a log collection unit, based on the access detected by the access detection unit, for collecting log information generated when the one terminal attempts to access; and a visualization unit, when a visualization request input for the log information collected by the log collection unit is received from an administrator terminal, for visualizing the nodes, the links and the log information on a visualization interface executed in the administrator terminal wherein the visualization unit, with respect to the log information on access failure, uses the log information to display a node including a terminal attempting the access and a server to be accessed and links between nodes, and a visual effect indicating failure of log information, on the visualization screen of the server-terminal connection network on the visualization interface.

Advantageous Effects

According to the present invention, through the visualization interface, the administrator may check an access failure list and, when selecting the access failure list, may directly check nodes for terminals, intermediate terminals, servers and the like upon access failure, and links that connect corresponding nodes, so that the route from which the security threat occurs can be very easily identified on the visualization interface, thereby increasing the efficiency of network security management by the administrator.

In addition, when the functions are performed by the behavior replay step, the visualization unit and the like, the behavior as a cause of the access failure, that is, the input data and the code information generated thereby can be replayed in the same manner as being directly inputted by the corresponding account, so that the cause upon occurrence of the threat can be identified very quickly and accurately.

DESCRIPTION OF DRAWINGS

FIGS. 1 to 6 are flowcharts of a method for visualizing a route and a behavior of a user by linking a security threat and a security kernel of a server-terminal connection network according to one embodiment of the present invention.

FIG. 7 is a block diagram showing a configuration of a device for visualizing a route and a behavior of a user by linking a security threat and a security kernel of a server-terminal connection network according to one embodiment of the present invention.

FIG. 8 is a diagram for explaining structures of collected according to one embodiment of the present invention and information used for visualization.

FIGS. 9 to 11 are examples of interface screens displayed on an administrator terminal according to one embodiment of the present invention.

FIG. 12 shows one example of an internal configuration of a computing device according to one embodiment of the present invention.

BEST MODE

Mode for Invention

Hereinafter, various embodiments and/or aspects will be described with reference to the drawings. In the following description, a plurality of specific details are set forth to provide comprehensive understanding of one or more aspects for the purpose of explanation. However, it will also be appreciated by a person having ordinary skill in the art that such aspect (s) may be carried out without the specific details. The following description and accompanying drawings will be set forth in detail for specific illustrative aspects among one or more aspects. However, the aspects are merely illustrative and some of various ways among principles of the various aspects may be employed, and the descriptions set forth herein are intended to include all the various aspects and equivalents thereof.

The term "embodiment", "example", "aspect", "exemplification", or the like as used herein may not be construed in that an aspect or design set forth herein is preferable or advantageous than other aspects or designs. In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, unless defined otherwise in embodiments of the present invention, all terms used herein including technical or scientific terms have the same meaning as commonly understood by a person having ordinary skill in the art. Terms such as those defined in generally used dictionaries will be interpreted to have the meaning consistent with the meaning in the context of the related art, and will not be interpreted as an ideal or excessively formal meaning unless expressly defined in an embodiment of the present invention.

FIGS. 1 to 6 are flowcharts of a method for visualizing a route and a behavior of a user by linking a security threat and a security kernel of a server-terminal connection network according to one embodiment of the present invention. FIG. 7 is a block diagram showing a configuration of a device for visualizing a route and a behavior of a user by linking a security threat and a security kernel of a server-terminal connection network according to one embodiment of the present invention. FIG. 8 is a diagram for explaining structures of log information collected according to one embodiment of the present invention and information used for visualization. FIGS. 9 to 11 are examples of interface screens displayed on an administrator terminal according to one embodiment of the present invention. In the following description, a plurality of embodiments and configurations will be described with reference to a plurality of drawings according to the present invention.

In the following description, it will be understood that a method for visualizing a route and a behavior of a user by linking a security threat and a security kernel of a server-terminal connection network according to each embodiment of the present invention shown in FIGS. 1 to 6 is performed by components of a computing device shown in FIG. 12 described later or a device for visualizing a route and a behavior of a user by linking a security threat and a security kernel of a server-terminal connection network 10 according to each embodiment of the present invention shown in FIG. 7 (hereinafter referred to as 'device of the present invention'). In other words, the computing device of FIG. 12 and the device 10 of the present invention may be understood as the same configuration, and the computing device may refer to a server computer or an administrator terminal for managing the server-terminal connection network.

In the present invention, the server-terminal connection network refers to a network in which a plurality of terminals and servers are connected through a network including a wired and wireless security kernel, and includes communication processing devices such as terminal devices, exchange devices and transmission devices, as a plurality of devices arranged for connection through a wired or wireless network between terminals, servers, and terminals and servers, and may be composed of nodes representing the above devices, and links representing network routes between the nodes.

In addition, the server-terminal connection network may be multiple types of configurations referred to as topologies. The topology is a form of connection between devices (terminals) in a local area network (LAN), and refers to a physically connection between the above-mentioned nodes and links or a connection scheme thereof.

The topology in a network structure includes, for example, a mesh type topology mainly used in public data communication networks, thereby having the longest routes. Since all terminals are connected to each other, the connectivity between nodes is very high, and it is advantageous when a large amount of communication is required from a large number of terminals. On the contrary it costs much for construction and it is difficult to manage due to complexity.

Another example is a star type. In general, it is also referred to as centralized type or radial type. Since a centralized server computer manages all clients, it is easy to find and repair faults, and it is easy to expand and transfer nodes. However, when the centralized computer (server) fails, all terminals are paralyzed.

A ring type or loop type refers to a type in which data flows in only one direction and bottlenecks are rare. It is accessible from both directions to have high flexibility for communication rotation failure. When a network for a node is disconnected, a bypass is configured to enable the communication. However, the network is required to be disconnected when a node is added, and failure on the entire network occurs when one line is disconnected.

A bus type refers to the case in which several terminals are connected to one communication line. Data is transmitted in both directions, and the transmitted data can be received by all nodes. since it can be installed when a cable and a network card are provided, costs are reduced and it is easy to build. However, the entire communication is impossible when a main cable is disconnected, and the network performance is degraded when many computers are connected. In addition, a distance for transmission is limited.

A tree type is also referred to as a hierarchical type or distributed type, and corresponds to an example of configuring a distributed processing system. The type has a tree shape in which several nodes are connected to one node, and data can be transmitted to all nodes in both directions. It is a scheme used in hubs that are actually used, so that the number of communication lines is saved, the communication line is shortened, and the network is easily expanded. However, a problem in an upper node affects all lower nodes, a bottleneck may occur at a central point, and the network is paralyzed or split when a failure occurs of the central point.

In the present invention, the above-described server-terminal connection network may be configured selectively or in combination with each other.

In the server-terminal connection network, a computing device first, performs an access detection step S10 of detecting an attempt to access one server (or another terminal) from one terminal. In the present invention, the one terminal refers to a terminal device used by a user using an account to access the one server. In addition, the one server may be another terminal as described above, so it will be understood as referring to a target terminal to be accessed by a user using an account in the network access structure.

When an access attempt is detected, the computing device performs a log collection step S20, with respect to the detected connection, of collecting log information generated when one terminal attempts to access. In the present invention, a network management terminal and the like basically manage log information generated according to access attempts, when one terminal as a specific terminal accesses a terminal that performs main functions of the above-described server or the like or manages data in a managed server-terminal connection network. In the present invention, in step S20, it may also be understood that a computing device certified based on function performance of the above-described network management terminal or the device 10 of the present invention performs a function of receiving log information from the corresponding management terminal.

While the log information is collected during performance of step S20 or for a predetermined period of time (such as 1 hour or 1 day) after the entire performance, the computing device performs a visualization step S30, when a visualization request input for the log information collected in step S20 is received from the administrator terminal, of visualizing nodes, links and log information on a visualization interface executed in the administrator terminal.

The visualization interface is shown in FIGS. 9 and 10 for example. First, the interface screen 300 in FIG. 9 is an example screen on which the visualization interface is outputted in the administrator terminal. First, the interface screen indicates information on a network structure screen 301 for visualizing a structure of nodes and links, log information 303 collected on the corresponding network structure screen 301, an access count 302 estimated as a threat to the server-terminal connection network according to access failures described later at a specific node when the node is selected, and a tree structure 304 of the server-terminal connection network.

In particular, in order to intuitively, quickly and accurately monitor threatening behaviors on the server-terminal connection network for the object of the present invention, in step S30 according to one embodiment of the present invention, based on log information with access failure, the log information is used to display a node including a terminal attempting the access and a server to be accessed and links between nodes, and a visual effect indicating failure of log information, on the visualization screen of the server-terminal connection network on the visualization interface.

In the present invention, the visual effect signifies that nodes and links related to the log information with the failed access can be intuitively recognized differently from other nodes and links, in the above-described network structure screen 301. For example, various visual events such as color, size, thickness, turning-off and turning-on effects may be generated. In particular, in the above-described screen 300 of FIG. 9, the log information 303 may also list and output only the log information with failed access. In addition, when it is implemented to select the above-described predetermined period (such as 1 hour or 1 day), log information with failed access during the corresponding period may be outputted.

In addition, in this case, when any one of the log information 303 is selected, the above-described visual effects may be displayed for nodes and links related to the selected log information. Meanwhile, the nodes and links related to log information refers to the above-described one terminal used to attempt the access by the user account, the above-described one server to be accessed, and communication processing devices between the one terminal and the one server and network connecting the above components.

In the embodiment, in addition to collecting more accurate logs, the method may include steps for each specific component of the step S20 as shown in FIG. 2 in order to accurately collect only the log information with failed access as described above and implement a specific embodiment of the visualization step S30 be described later and a specific embodiment of the behavior replay step S40 of FIG. 4.

In performing step S20, the computing device, first performs a first collection step S21, when access is failed from one terminal, of collecting access failure time, terminal identification a information, user account attempting the access through the terminal, and an IP of the access behavior. Thereafter, the computing device performs a second collection step S22 of collecting type information on the terminal with failed access and an IP of the terminal from an external database. Finally, the computing device performs a log information generation step S23 of combining the pieces of information collected in steps S21 and S22 and processing the combined information into the above-described log information.

Referring to FIG. 8 as a specific example, in order to identify access routes to visualize the access routes through step S30, the computing device collects second information 201, as type information of each terminal, including the IP of the corresponding terminal together with information on a black type determined as a threatening object and a white type not determined as the threatening object, and types or the like of other equipment in step S22 by using an IP management system for terminals managed through the external database.

At the same time, when the access failure is detected, collection time, that is, time (access-failed time) when the access is detected as failed and the log information is collected, identification information of the terminal used at that time, and the IP indicating the account and the behavior of the user are collected as the first information 202 through step S21.

Preferably, when the first information 202 is first collected through step S21 as described above, the second information 201 may be collected through step S22 based on the identification information and the behavior IP of the identified terminal.

Thereafter, the first information 202 and the second information 201 are combined to generate log information 203 referred to as teletypewriter (TTY) information, so that a stage 200 capable of embodying the access route is completed.

According to the performance of step S20 and the subsequent step S30, when a threatening behavior due to access failure is detected, the computing device can immediately check log information on all access failures as described above on the screens 300 and 310 of FIGS. 9 and 10, and simultaneously visually check the route through the network structure screens 301 and 311, so as to very intuitively and easily check an accurate network that detects the threatening behavior and accurate nodes and links that generate the threatening behavior.

Meanwhile, when the above visual effects are applied, step S30 may include a specific embodiment as shown in FIG. 3 in order to enable the administrator to more intuitively identify a type of threating behavior and a cause of the threating behavior.

Referring to FIG. 3, the computing device in the performance of step S30 first performs a threat node identification step S31, with respect to the log information with failed access, of using an IP of the access behavior to identify a node causing the access failure as a cause node.

The terminal IP or the server IP is merely a node attempting to access or a node to be accessed when a specific threatening behavior occurs, and may include a target IP according to behavior data (input data described later and code information generated thereby) for each behavior. When the behavior IP is analyzed, the IP is detected at the time of access failure, so that the node having caused the access failure may be immediately identified as the cause node.

When the cause node is identified in step S31, the computing device performs a visualization target identification step S32 of identifying a first node corresponding to the terminal attempting to access, a second node corresponding to the server to be accessed, a cause node, and a threat link serving as a link between the first node, the second node, and the cause node.

In other words, in step S32, links as routes included in the log information are identified as threat links, and further, the first node, the second node, and the cause node are identified and used.

When step S32 is performed, the computing device performs an effect application step S33 of applying visual effects different from those of the other nodes to the first node, the second node, and the cause node, and applying visual effects different from the other links to the threat link, so as to control an output to be outputted differently from nodes and links included in the server-terminal connection network outputted on the visualization interface.

Meanwhile, in the performance of step S33, in addition to visually displaying all information related to the log information on the threatening behavior with access failure so as to be distinguished from other server-terminal connection network structures, the node having caused the access failure is displayed more clearly when the cause node is identified, so that all managers, such as managers with know-how and managers with knowledge of the server-terminal connection network structure, can significantly identify the detailed type and information of the threatening behavior only by checking the visualization interface.

To this end, in the performance of step S33, the computing device may apply the links containing the cause node and the visual effects on the cause node so as to be differently from other nodes and links identified by the visualization target identification step S32.

In other words, upon selection of the case in which the access failure occurred, the node and link information related to the access failure is checked first in the network structure screen on the visualization interface as described above through step S32, to primarily distinguish accurate nodes and links on the network in which the access failure occurs, and particularly when the node directly causing the access failure is detected through the behavior IP, the cause node and the link directly passing through the cause node are secondarily distinguished from the nodes and the links to which the primarily distinguished visual effects are applied.

Meanwhile, examples of the visualization interface are shown in FIGS. 9 and 10. Comparing FIG. 9 with FIG. 10, it can be confirmed that the screen 300 of FIG. 9 and the screen 310 of FIG. 10 have fields of view (FOV) different from each other in the network structure screens 301 and 311. In other words, a function for enabling the management on the threatening behavior may be performed through easy understanding by the administrator and clear understanding of the connection structure.

In other words, in the performance of step S30, the computing device may control some nodes and links for the server-terminal connection network to be displayed on the visualization interface, through the function of Zoom-in/Zoom-out or the selection of network group subject to the input by the administrator terminal.

In other words, the number and width of nodes and links outputted on one network structure screen 301 and 311 may be controlled through the Zoom-in or Zoom-out subject to the manipulation of the input mechanism on the network structure screens 301 and 311 among the screens in FIGS. 9 and 10. In addition, vertical and horizontal FOV shifts may also be provided.

In addition, when a specific tree is selected for the tree structures 304 and 314 of the server-terminal connection network, the administrator may select a desired equipment or equipment group among group units of equipment defined in the administrator account for management and accordingly, the network structure screens 301 and 311 including the corresponding equipment group may be outputted.

Meanwhile, the other log information 303 and 313 may also output the log information with access failure between the nodes displayed on the network structure screen 301 and 311, or may display only the log information corresponding to the access count 302 and 312 as the log information 303 and 313. The access count 301 and 312 may be understood as outputting the number of failed access when a specific node is selected on the network structure screen 301 and 311.

Meanwhile, in various embodiments of the present invention, the above information on the threatening behavior may include information for identifying which behavior has occurred from the log information, in addition to route information that may be identified according to the implementation of one embodiment of the present invention as described above. In the case of providing the above information, and particularly when a threatening behavior can be replayed in a substantially identical manner as the threatening behavior occurs, the administrator may easily perform detailed analysis on the threatening behavior, so that the security management effect linked with the security kernel in the server-terminal connection structure can be maximized.

To this end, as shown in FIG. 4, when the selected input for the node of interest of the administrator terminal is received after performing step S30, the computing device may further perform a behavior replay step S40 of outputting log information performed on the node of interest to one section of the visualization interface.

In step S40, the node of interest refers to a node selected to check log information, a route and the like from the administrator terminal in the above description. In order to perform step S40, it may be understood that a separate request input is required through the input mechanism of the administrator terminal for performing step S40 on the visualization interface.

In step S40, for detailed analysis on the above-described threatening behavior, it is preferable that the log information outputted to the one section includes code data included in the threatening behavior as described above, in addition to the above-described access failure time, the terminal identification information, the user account attempting the access through the terminal, and the IP of the access behavior, the type information on the terminal with failed access and the log information including IP of the terminal.

To this end, in the performance of step S40 according to another embodiment of the present invention, the computing device may perform specific functions as shown in FIG. 5.

Referring to FIG. 5, the computing device first performs a behavior information tracking step S41 of outputting the log information with access failure among the log information performed on the node of interest, and extracting behavior information, which includes input data inputted for access at the node by using the information included in the log information and access attempt code information generated according to the input data, from the node. The input data and the access attempt code information generated in the terminal according to the input data and transmitted through a link may be received from the above-described external database, that is, a database that manages all log information. Alternatively, when the above-described behavior information is stored in terminals on the network, that is, in the nodes themselves, it may also be understood as directly extracting corresponding behavior information from the nodes as described above, assuming that access to each terminal is allowed for security reasons.

When step S41 is performed, the computing device performs a behavior output step S42 of outputting the above-described behavior information and the log information corresponding to the behavior information to one section of the visualization interface.

In other words, in addition to the above-described log information, the input data inputted by the user account through the terminal (node) in order to generate the corresponding log information, and the access attempt code information generated by performing the function of the interface into which the input data is input are specifically included as the behavior information in the information outputted through step S42.

Accordingly, the route for the threatening behavior and the detailed behavior information upon occurrence of the corresponding threatening behavior are checked on one visualization interface, so that threats can be identified and responded faster and more accurately.

The flow in the above manner completes the stage 200 capable of searching for routes, for example, in the description of FIG. 8 described above. Thereafter, when the computing device utilizes the log information 203 according to the flow of step S40, data 211 obtained by inputting the log information and the above-described access attempt code information is outputted as replayed data 212 described later, so that a stage 210 capable of replaying the behavior may be implemented.

In addition, step S42 may be implemented in a more detailed manner in order to easily and accurately identify and respond to threats through a more realistic replay of the behavior.

In other words, referring to FIG. 6, in the performance of step S42, the computing device performs a code analysis step S421 in which the input data and the access attempt code information included in the behavior information are split for each unit function included in the access process and divided into unit codes. Since each code information may be composed of detailed functional units such as specific functions in the data structure, the code information is analyzed to divide each unit code.

When step S421 is performed, the computing device performs a timeline analysis step S422 of calculating a generation timing for each unit code by using the data log of the behavior information. When a code, such as an access attempt code, for performing a predetermined process is generated on the network, information about a timing of generating the corresponding information is generally included. The generation timing of the unit code described above is identified through step S422.

When step S422 is performed, the computing device performs an output control step S423 of sequentially outputting the unit codes from an output timing of the behavior information based on the generation timing of each unit code. The output timing of the behavior information signifies a performing timing of step S40. Whether each identified timing is relative or absolute, the corresponding code is outputted sequentially and exactly at the corresponding timing according to the timing of performing step S40 and according to an error of the timing of each unit code.

For example, FIG. 11 is a screen 400 as an example showing a screen outputted according to S40 and the following specific embodiment of S40. Referring to FIG. 11, it is confirmed that data 401 inputted by the user and access attempt code information 402 generated thereby are sequentially outputted from a timing of inputting a playback item 403.

Accordingly, the occurrence of threatening behavior may be identified more thoroughly and substantially, so that the effectiveness of responding to threats and the effectiveness of monitoring the threats can be remarkably increased.

Meanwhile, FIG. 7 is a diagram for explaining the configuration of the device 10 of the present invention. When the device 10 of the present invention is described, parts overlapping with the above descriptions will be omitted.

Referring to FIG. 7, the device 10 of the present invention includes an access detection unit 11, a log collection unit 12, and a visualization unit 13, and a server-terminal connection network 100 composed of nodes N1 to N5 and links connecting the nodes, the above-described external database 30 and the administrator terminal 20 may be connected to the device 10 of the present invention.

The access detection unit 11 functions to detect an attempt to access one server from one terminal in the server-terminal connection network 100. In other words, it may be understood as being configured to perform functions performed by all computing devices mentioned in the description of step S10.

The log collection unit 12 functions to collect log information generated when one terminal attempts to access, based on the accesses detected by the access detection unit 11. In other words, it may be understood as being configured to perform functions performed by all computing devices mentioned in the description of step S20 and steps S21 to S23 as specific examples thereof.

When receiving a visualization request input from the administrator terminal 20 for the log information collected by the log collection unit 12, the visualization unit 13 functions to visualize the nodes, the links, and the log information on the visualization interface performed in the administrator terminal 20. With respect to the log information on access failure, the visualization unit 13 uses the log information, so that a node including a terminal attempting the access and a server to be accessed and links between nodes, and a visual effect indicating failure of log information are displayed on the visualization screen of the server-terminal connection network 100 on the visualization interface. In other words, it may be understood as being configured to perform functions performed by all computing devices mentioned in the description of step S30 and steps S31 to S33 as specific examples thereof.

Meanwhile, the visualization unit 13 functions performed by all computing devices mentioned in the description of step S40 and steps S41, S42, S421, S422 and S423 as specific examples thereof may be additionally embodied according to implementations of other embodiments of the present invention.

FIG. 12 shows one example of an internal configuration of a computing device according to one embodiment of the present invention. In the following description, unnecessary descriptions for embodiments redundant with those of FIGS. 1 to 4 will be omitted.

As shown in FIG. 12, the computing device 10000 may at least include at least one processor 11100, a memory 11200, a peripheral interface 11300, an I/O subsystem 11400, a power circuit 11500, and a communication circuit 11600. The computing device 10000 may correspond to a user terminal A connected to a tactile interface device or correspond to the above-mentioned computing device B.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 10000.

The access to the memory 11200 from other components of the processor 11100 or the peripheral interface 11300 may be controlled by the processor 11100.

The peripheral interface 11300 may combine an input and/or output peripheral device of the computing device 10000 to the processor 11100 and the memory 11200. The processor 11100 may execute the software module or the instruction set stored in memory 11200, thereby performing various functions for the computing device 10000 and processing data.

The input/output subsystem 11400 may combine various input/output peripheral devices to the peripheral interface 11300. For example, the input/output subsystem 11400 may include a monitor, a keyboard, a mouse, a printer or a controller for coupling a peripheral device such as a touch screen or a sensor to the peripheral interface 11300 as needed. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power management system, at least one power source such as a battery or an alternating current (AC), a charging system, a power failure detection circuit, a power converter or inverter, a power status indicator, or any other components for generating, managing, and distributing the power.

The communication circuit 11600 may use at least one external port to enable communication with other computing devices.

Alternatively, as described above, if necessary, the communication circuit 11600 may include an RF circuit to transmit and receive an RF signal, also known as an electromagnetic signal, thereby enabling communication with other computing devices.

The above embodiment of FIG. 12 is merely an example of the computing device 10000, and the computing device 11000 may have a configuration or arrangement in which some components shown in FIG. 12 are omitted, additional components not shown in FIG. 12 are further provided, or at least two components are combined. For example, a computing device for a communication terminal in a mobile environment may further include a touch screen, a sensor or the like in addition to the components shown in FIG. 12, and the communication circuit 1160 may include a circuit for RF communication of various communication schemes (such as WiFi, 3G, LTE, Bluetooth, NFC, and Zigbee). The components that may be included in the computing device 10000 may be implemented by hardware, software, or a combination of both hardware and software which include at least one integrated circuit specialized in a signal processing or an application.

The methods according to the embodiments of the present invention may be implemented in the form of program instructions to be executed through various computing devices, so as to be recorded in a computer-readable medium. In particular, a program according to the embodiment may be configured as a PC-based program or an application dedicated to a mobile terminal. The application to which the present invention is applied may be installed in a user terminal through a file provided by a file distribution system. For example, the file distribution system may include a file transmission unit (not shown) for transmitting the file according to a request of the user terminal.

The above-mentioned device may be implemented by hardware components, software components, and/or a combination of the hardware components and the software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, those skilled in the art will be appreciated that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, and computer storage medium or device. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, so as to be recorded in a computer-readable medium. The computer-readable medium may include program instructions, data files, data structures, and the like, independently or in combination thereof. The program instructions recorded on the media may be specially designed and configured for the embodiment, or may be known to those skilled in the art of computer software so as to be used. An example of the computer-readable medium includes, a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like, as well as a machine code created by a compiler. The above hardware device may be configured to operate as at least one software module to perform the operations of the embodiments, and vise versa.

Although the above embodiments have been described with reference to the limited embodiments and drawings, however, it will be understood by those skilled in the art that various changes and modifications may be made from the above-mentioned description Appropriate results may be achieved even though, for example, the described descriptions are performed in an order different from the described manner, and/or the described components such as system, structure, device, and circuit are coupled or combined in a form different from the described manner, or replaced or substituted by other components or equivalents. Therefore, other implementations, other embodiments, and equivalents to the claims are also within the scope of the following claims.

The invention claimed is:

1. A method for visualizing a route and a behavior of a user by linking a security threat and a security kernel of a server-terminal connection network and implemented by a computing device including at least one processor and at least one memory for storing instructions executable by the processor, the method comprising:
   an access detection step of setting a plurality of terminals, servers accessible from the terminals, and communication processing devices between the terminals and the servers as nodes, and detecting an attempt to access one server from one terminal in a server-terminal connection network including a route on the network connecting the set nodes as links;
   a log collection step, based on the access detected in the access detection step, of collecting log information generated when the one terminal attempts to access; and
   a visualization step, when a visualization request input for the log information collected in the log collection step is received from an administrator terminal, of visualizing the nodes, the links and the log information on a visualization interface executed in the administrator terminal, wherein
   the visualization step, with respect to the log information on access failure, includes using the log information to display a node including a terminal attempting the access and a server to be accessed and links between nodes, and a visual effect indicating failure of log information, on the visualization screen of the server-terminal connection network on the visualization interface, wherein the visualization step further comprises:
   displaying an organizational arrangement in which multiple locations are arranged in operational dependencies and allowing a security operator to select a location within the arrangement to check for a login access failure for the selected location;
   displaying a network topology with a group of the nodes for the selected location and allowing zooming and rotating one or more said nodes and connections between the nodes; and
   displaying analysis data in a separate user interactive window on a portion of the visualization interface for one or more selected nodes in the network topology, wherein the analysis data includes a total number of logging access failure events and a list of the logging access failure events for corresponding one or more selected nodes.

2. The method of claim 1, wherein the log collection step includes:
   a first collection step, when access is failed from the one terminal, of collecting access failure time, terminal identification information, a user account attempting the access through the terminal, and an IP of the access behavior;
   a second collection step of collecting type information on the terminal with failed access and an IP of the terminal from an external database; and
   a log information generation step of combining the pieces of information collected in the first collection step and the second collection step and processing the combined information into log information.

3. The method of claim 2, wherein the visualization step includes:
   a threat node identification step, with respect to the log information with failed access, of identifying a node causing the access failure as a cause node by using an IP of the access behavior;
   a visualization target identification step of identifying a first node corresponding to the terminal attempting to access, a second node corresponding to the server to be accessed, a cause node, and a threat link serving as a link between the first node, the second node, and the cause node; and
   an effect application step of applying visual effects different from those of the other nodes to the first node, the second node, and the cause node and applying visual effects different from the other links to the threat link, to control an output to be outputted differently from nodes and links included in the server-terminal connection network outputted on the visualization interface.

4. The method of claim 3, wherein the effect application step includes applying the links containing the cause node and the visual effects on the cause node so as to be differently from other nodes and links identified by the visualization target identification step.

5. The method of claim 1, wherein the visualization step includes controlling some nodes and links for the server-terminal connection network to be displayed on the visualization interface through the function of Zoom-in/Zoom-out or the selection of network group subject to the input by the administrator terminal.

6. The method of claim 1, further comprising:
   a behavior replay step, when the selected input for the node of interest of the administrator terminal is received after performing the visualization step, of outputting log information performed on the node of interest to one section of the visualization interface.

7. The method of claim 6, wherein the behavior replay step includes:
   a behavior information tracking step of outputting the log information with access failure among the log information performed on the node of interest, and extracting behavior information, which includes input data inputted for access at the node by using the information included in the log information and access attempt code information generated according to the input data, from the node; and
   a behavior output step of outputting the behavior information and the log information corresponding to the behavior information to one section of the visualization interface.

8. The method of claim 7, wherein the behavior output step includes:
   a code analysis step in which the input data and the access attempt code information included in the behavior information are split for each unit function included in the access process and divided into unit codes;
   a timeline analysis step of calculating a generation timing for each unit code by using the data log of the behavior information; and an output control step of sequentially outputting the unit codes from an output timing of the behavior information based on the generation timing of each unit code.

9. A device for visualizing a route and a behavior of a user by linking a security threat and a security kernel of a server-terminal connection network, and implemented by a computing device including at least one processor and at least one memory for storing instructions executable by the processor, the device comprising:
- an access detection unit for setting a plurality of terminals, servers accessible from the terminals, and communication processing devices between the terminals and the servers as nodes, and detecting an attempt to access one server from one terminal in a server-terminal connection network including a route on the network connecting the set nodes as links;
- a log collection unit, based on the access detected by the access detection unit, for collecting log information generated when the one terminal attempts to access; and
- a visualization unit for visualizing the nodes, the links and the log information on a visualization interface executed in the administrator terminal, when a visualization request input for the log information collected by the log collection unit is received from an administrator terminal, wherein, the visualization unit, with respect to the log information on access failure, uses the log information to display a node including a terminal attempting the access and a server to be accessed and links between nodes, and a visual effect indicating failure of log information, on the visualization screen of the server-terminal connection network on the visualization interface, wherein the visualization unit is configured to display:
- an organizational arrangement in which multiple locations are arranged in operational dependencies and allowing a security operator to select a location within the arrangement to check for a login access failure for the selected location;
- a network topology with a group of the nodes for the selected location allowing zooming and rotating one or more said nodes and connections between the nodes; and analysis data in a separate user interactive window on a portion of the visualization interface for one or more selected nodes in the network topology, wherein the analysis data includes a total number of logging access failure events and a list of the logging access failure events for corresponding one or more selected nodes.

10. A non-transitory computer-readable recording medium storing instructions for allowing a computing device to perform:
- an access detection step of setting a plurality of terminals, servers accessible from the terminals, and communication processing devices between the terminals and the servers as nodes, and detecting an attempt to access one server from one terminal in a server-terminal connection network including a route on the network connecting the set nodes as links;
- a log collection step, based on the access detected in the access detection step, of collecting log information generated when the one terminal attempts to access; and
- a visualization step of visualizing the nodes, the links and the log information on a visualization interface executed in the administrator terminal, when a visualization request input for the log information collected in the log collection step is received from an administrator terminal, wherein
- the visualization step with respect to the log information on access failure includes using the log information to display a node including a terminal attempting the access and a server to be accessed and links between nodes, and a visual effect indicating failure of log information, on the visualization screen of the server-terminal connection network on the visualization interface, wherein the visualization step further comprises:
- displaying an organizational arrangement in which multiple locations are arranged in operational dependencies and allowing a security operator to select a location in the arrangement to check for a login access failure for the selected location:
- displaying a network topology with a group of the nodes for the selected location and allowing zooming and rotating one or more said nodes and connections between the nodes; and
- displaying analysis data in a separate user interactive window on a portion of the visualization interface for one or more selected nodes in the network topology, wherein the analysis data includes a total number of logging access failure events and a list of the logging access failure events for corresponding one or more selected nodes.

* * * * *